(12) United States Patent
Palmqvist et al.

(10) Patent No.: US 10,945,407 B2
(45) Date of Patent: Mar. 16, 2021

(54) MILKING ARRANGEMENT AND METHOD FOR GUIDING ANIMALS THROUGH A MILKING ARRANGEMENT

(71) Applicant: DELAVAL HOLDING AB, Tumba (SE)

(72) Inventors: Martin Palmqvist, Tumba (SE); Robert Jensen, Tumba (SE)

(73) Assignee: DeLaval Holding AB, Tumba (SE)

( * ) Notice: Subject to any disclaimer, the term of this patent is extended or adjusted under 35 U.S.C. 154(b) by 539 days.

(21) Appl. No.: 15/578,582

(22) PCT Filed: May 30, 2016

(86) PCT No.: PCT/SE2016/050502
§ 371 (c)(1),
(2) Date: Nov. 30, 2017

(87) PCT Pub. No.: WO2016/195579
PCT Pub. Date: Dec. 8, 2016

(65) Prior Publication Data
US 2018/0153132 A1    Jun. 7, 2018

(30) Foreign Application Priority Data
Jun. 1, 2015    (SE) ........................ 1550701

(51) Int. Cl.
*A01K 1/00*    (2006.01)
*A01K 1/12*    (2006.01)
(Continued)

(52) U.S. Cl.
CPC ............. *A01K 1/0023* (2013.01); *A01J 5/017* (2013.01); *A01K 1/12* (2013.01); *A01K 1/126* (2013.01); *A01K 11/006* (2013.01)

(58) Field of Classification Search
CPC .......... A01K 1/12; A01K 1/0023; A01K 1/26; A01K 1/0209
See application file for complete search history.

(56) References Cited

U.S. PATENT DOCUMENTS

2008/0282985 A1    11/2008    Schulte
2010/0282172 A1    11/2010    Eriksson et al.
(Continued)

FOREIGN PATENT DOCUMENTS

GB    1 058 946 A    2/1967
SU    436646 A1    7/1974
(Continued)

OTHER PUBLICATIONS

International-Type Search Report, dated Jan. 12, 2016, from corresponding SE application No. 1550701-5.

*Primary Examiner* — Jessica B Wong
(74) *Attorney, Agent, or Firm* — Nixon & Vanderhye

(57) ABSTRACT

A milking arrangement that includes at least a first and a second milking system for milking animals, a common entrance lane configured to allow a plurality of animals to enter the milking arrangement, and a guiding structure configured to guide each of the plurality of animals to either one of the first and second milking systems to be milked therein, where the guiding structure comprises a smart gate arrangement that guides each animal, after having been identified, to a respective one of the first and second milking systems depending on the identity of the animal, and where, depending upon selected periods of time, such as during periods of low expected or measured utilization of the milking arrangement, the smart gate arrangement guides each animal to a single one of the first and second milking systems irrespective of the identity of the animal.

20 Claims, 3 Drawing Sheets

(51) Int. Cl.
 *A01J 5/017* (2006.01)
 *A01K 11/00* (2006.01)

(56) References Cited

U.S. PATENT DOCUMENTS

| | | | | |
|---|---|---|---|---|
| 2011/0308469 A1* | 12/2011 | Vollmer | ............ | A01K 1/126 |
| | | | | 119/14.04 |
| 2012/0103266 A1* | 5/2012 | Nilsson | ............ | A01K 1/126 |
| | | | | 119/14.02 |
| 2013/0112143 A1 | 5/2013 | Mulder | | |

FOREIGN PATENT DOCUMENTS

| | | |
|---|---|---|
| WO | 00/01226 A1 | 1/2000 |
| WO | 2006/098678 A1 | 9/2006 |
| WO | 2008/003341 A1 | 1/2008 |
| WO | 2011/084048 A1 | 7/2011 |

* cited by examiner

MILKING ARRANGEMENT AND METHOD FOR GUIDING ANIMALS THROUGH A MILKING ARRANGEMENT

TECHNICAL FIELD

The technical field is directed to dairy farming.

RELATED ART

A problem with advanced arrangements for guiding large herds of animals, such as cows, in dairy farms such as e.g. pasture or grassland based dairy farms is that the milking arrangement used may not be sufficiently versatile and configurable in order to cope with different scenarios in the dairy farms.

A similar problem may arise in dairy farms with larger herds and with milking arrangements comprising e.g. one or more rotating platforms, on which the animals stand while being milked, and a robot based automatic milking system comprising one or more stationary milking boxes, in each of which one animal is automatically milked at a time.

Especially a fluctuating utilization of the milking arrangements may be difficult to cope with in an efficient manner.

SUMMARY

It is an aim of this document to reveal novel milking arrangements and methods for guiding animals through a milking arrangement, which alleviate or at least mitigate problems of prior art.

A first aspect refers to a milking arrangement comprising at least a first and a second milking system for milking animals, a common entrance lane configured to allow a plurality of animals to enter the milking arrangement, and a guiding structure configured to guide each of the plurality of animals to either one of the first and second milking systems to be milked therein.

The guiding structure comprises a smart gate arrangement including an entrance through which animals can enter the smart gate arrangement, an animal identifier for identifying each animal having entered or is to enter the smart gate arrangement, and at least two separate exits, through which each animal, which has entered the smart gate arrangement, can be selectively guided to exit the smart gate arrangement after having been identified, to thereby be guided to a respective one of the first and second milking systems depending on the identity of the animal.

The smart gate arrangement is configured, during selected periods of time, to guide each animal, which has entered the smart gate arrangement, to exit the smart gate arrangement, to thereby be guided to a single one of the first and second milking systems irrespective of the identity of the animal.

This is an advantageous solution to avoid too low utilization of the milking arrangement, e.g. during night time, since one of the milking systems may be shut down for selected periods of time while all animals entering the smart gate arrangement are guided to the other milking system.

Especially if one of the milking systems comprises a rotary based milking implement with a rotating platform, on which the animals stand while being milked, this milking system may be shut down during periods of low utilization of the milking arrangement, such as during night time, while all animals entering the smart gate arrangement are guided to the other milking system, which preferably may be a robot based automatic milking system comprising one or more stationary milking boxes, in each of which one animal is milked at a time in an entirely automated manner.

The benefits of the above approach is that the milk production efficiency is increased since the rotary based milking implement is not used when it can be expected to be less occupied due to lower amounts of animals visiting the milking arrangement. Further, most rotary based milking implements require the presence of staff. By only using the robot based automatic milking system during night time, the night time staff can be strongly reduced, which in turn reduces the costs of running the dairy farm.

More generally, the smart gate arrangement may be configured, during the selected periods of time, which are determined as periods of time during which the utilization of the milking arrangement meets a selected criterion, to guide each animal, which has entered the smart gate arrangement, to exit the smart gate arrangement to thereby be guided to a single one of the first and second milking systems irrespective of the identity of the animal.

The selected periods of time may be periods of time, during which the utilization of the milking arrangement meets the selected criterion based on historical data of the utilization of the milking arrangement.

Alternatively, or additionally, the selected periods of time may be periods of time, during which the utilization of the milking arrangement meets the selected criterion based on continuous measurements of the utilization of the milking arrangement.

Preferably, the selected criterion comprises that the utilization of the milking arrangement is lower than a selected threshold.

In some instances, the selected criterion may be met during some night time hours.

In one embodiment, the first milking system comprises an exit lane and the second milking system comprises an exit lane, wherein at least one of the exit lane of the second milking system and an entrance lane leading to the entry of the second milking system surrounds, or at least partly surrounds, the first milking system.

By such provisions an advantageous approach is possible with common entrance and exit lanes is obtained avoiding animal crossings and solutions based on two story structures (i.e. lanes crossing other lanes via bridges or similar). An improved animal traffic through a milking arrangement can be obtained, which is more efficient, while the milk production efficiency and wellbeing of the animals can be increased.

In one embodiment, the above exit lanes comprises a smart gate arrangement configured to guide all incompletely milked animals exiting from the first and second milking systems to a single one of the first and second milking systems to be milked again therein.

The incompletely milked animals may be animals, which have not been milked sufficiently due to a failure of attaching teat cups to the teats of the animals or due to teat cups being unintentionally removed from the teats of the milking animals during milking, e.g. due to teat cup kick-offs.

By such provisions second milking attempts are always performed in the same milking system, which milking system may thus be designed for such task, while the other milking system may be optimized for high milk production, but may not be suitable to all animals.

Further, a return path for incompletely milked animals is obtained, which may be arranged further away from the milking systems, thereby optimizing animal traffic and avoiding disturbances between animals returned for another milking and animals that enter the milking arrangement through the common entrance lane. A compact and efficient design of the milking arrangement is obtained wherein incompletely milked animals always are guided to a single milking system, and a return path to the other milking system can be dispensed with.

A second aspect refers to a method for guiding animals through a milking arrangement comprising at least a first and a second milking system for milking animals; a common entrance lane configured to allow a plurality of animals to enter the milking arrangement; and a guiding structure configured to guide each of the plurality of animals to either one of the first and second milking systems to be milked therein. The guiding structure comprises a smart gate arrangement including an entrance through which animals can enter the smart gate arrangement, an animal identifier for identifying each animal having entered or is to enter the smart gate arrangement, and at least two separate exits, through which each animal, which has entered the smart gate arrangement, can be selectively guided to exit the smart gate arrangement after having been identified, to thereby be guided to a respective one of the first and second milking systems depending on the identity of the animal.

According to the method, each animal, which has entered the smart gate arrangement, is guided, during selected periods of time, by means of the smart gate arrangement, to exit the smart gate arrangement to thereby be guided to a single one of the first and second milking systems irrespective of the identity of the animal.

The embodiments and details described above with reference to first aspect can, after modifications, be adapted to the second aspect.

By the above aspects and embodiments, an improved animal traffic through a milking arrangement can be obtained, which is more efficient, while simultaneously the milk production per cost unit can be increased.

A problem may occur in a milking arrangement comprising one or more rotary milking systems, which are fast and efficient but typically requires staff, and a robot based automatic milking system comprising one or more stationary milking boxes, in each of which one animal is milked at a time in an entirely automatic manner. It shall be appreciated the rotary milking system provides for fast and cost-efficient milking, but lacks many of the analyzing capabilities the robot based automatic milking system typically has. Therefore, it may be important to pass animals that are suspected to be ill through the robot based automatic milking system, such that these animals can be analyzed and be positively diagnosed by the analyzing capabilities of the robot based automatic milking system. Similarly, also healthy animals should be analyzed at least on a regular basis.

Thus, some animals should be milked by one of the milking systems while other animals should be milked by another milking system. However, this may lead to new bottle necks since one milking system may be heavily used while the other milking system has low utilization.

It is an aim of this document to reveal novel milking arrangements and methods for guiding animals through a milking arrangement, which alleviate or at least mitigate the above problems.

A third aspect refers to milking arrangement comprising a first and a second milking system for milking animals, wherein the first and second milking systems comprise at least three entries; a common entrance lane configured to allow a plurality of animals to enter the milking arrangement; and a guiding structure configured to guide each of the plurality of animals having entered the milking arrangement via the entrance lane to either one of the first and second milking systems. The guiding structure comprises a smart gate arrangement including an entrance through which animals can enter the smart gate arrangement, an animal identifier for identifying each animal having entered or is to enter the smart gate arrangement, and at least two separate exits, through which each animal, which has entered the smart gate arrangement, can be selectively guided to a respective buffer pen after having been identified, wherein the first milking system is enterable from a first one of the buffer pens and the second milking system is enterable from a second one of the buffer pens.

The respective buffer pens are separated by a partition wall, which is movable to move one or more of the entries of the first and second milking systems from one of the buffer pens to the other one of the buffer pens, to thereby alter the sizes, and thus capacities, of the first and second milking systems.

The first milking system is defined as the milking equipment which is reached from one of the buffer pens and the second milking system is defined as the milking equipment which is reached from the other one of the buffer pens.

The buffer pens may form a circular structure and the partition wall may extend mainly radially and may be moved by means of being rotated.

In one embodiment, the partition wall is movable to move one or more of the entries of the first and second milking systems from one of the buffer pens to the other one of the buffer pens in response to the shares of animals to be milked in the respective one of the milking systems.

A fourth aspect refers to method for guiding animals through a milking arrangement comprising a first and a second milking system for milking animals, wherein the first and second milking systems comprise at least three entries; a common entrance lane configured to allow a plurality of animals to enter the milking arrangement; and a guiding structure configured to guide each of the plurality of animals having entered the milking arrangement via the entrance lane to either one of the first and second milking systems. The guiding structure comprises a smart gate arrangement including an entrance through which animals can enter the smart gate arrangement, an animal identifier for identifying each animal having entered or is to enter the smart gate arrangement, and at least two separate exits, through which each animal, which has entered the smart gate arrangement, can be selectively guided to a respective buffer pen after having been identified, wherein the first milking system is enterable from a first one of the buffer pens and the second milking system is enterable from a second one of the buffer pens, According to the method, a partition wall, which separates the respective buffer pens, is moved to move one or more of the entries of the first and second milking systems from one of the buffer pens to the other one of the buffer pens, to thereby alter the sizes, and thus capacities, of the first and second milking systems.

The embodiments and details described above with reference to third aspect can, after modifications, be adapted to the fourth aspect.

By the above aspects and embodiments, an improved animal traffic through a milking arrangement can be obtained, which is more efficient, while simultaneously the milk production per cost unit can be increased. Animals are guided to selected milking systems, while the partition wall separating the buffer pens is moved to alter the sizes, and thus capacities, of the milking systems to avoid bottle necks in the milk production due to short capacity of either one of the milking systems.

Further characteristics and advantages will be evident from the detailed description of embodiments given hereinafter, and the accompanying FIGS. 1-3, which are given by way of illustration only.

DETAILED DESCRIPTION OF EMBODIMENTS

Figure 1:
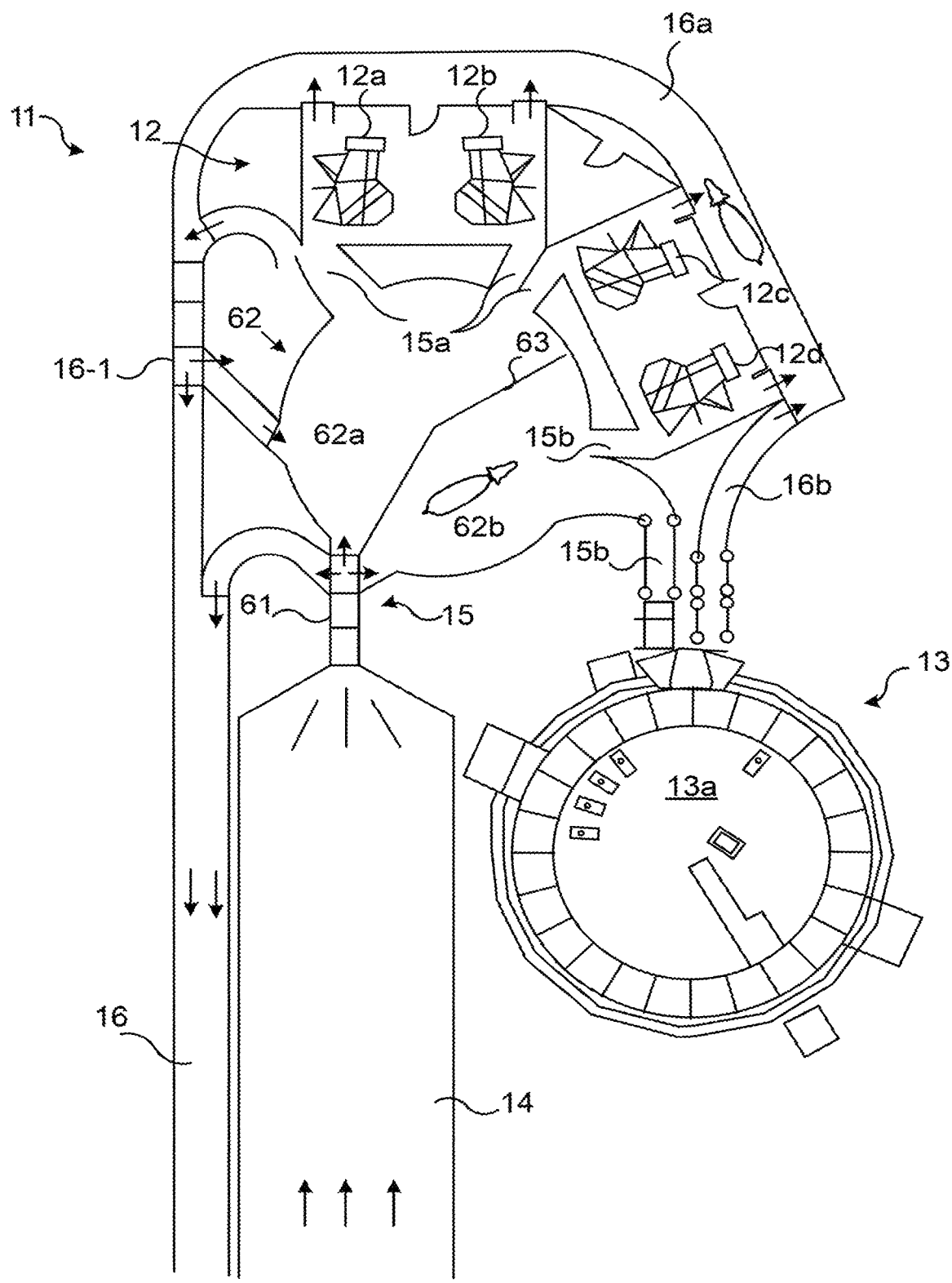
FIG. 1 illustrates, schematically, in top view, a milking arrangement according to an embodiment.

FIG. 1 illustrates, schematically, in top view, a milking arrangement 11 according to an embodiment. The milking arrangement 11 comprises a first 12 and a second 13 milking system for milking animals, a common entrance lane 14 configured to allow a plurality of animals to enter the milking arrangement 11, a guiding structure 15 configured to guide each of the plurality of animals to either one of the first and second milking systems 12, 13 to be milked therein, and a common exit lane 16 configured to allow the plurality of animals to leave the milking arrangement 11 after having been milked.

In order to avoid animal crossings, a particular design may be desired. In the embodiment of FIG. 1, the guiding structure 15 comprises a smart gate arrangement 61 including an entrance through which animals can enter the smart gate arrangement 61, an animal identifier for identifying each animal having entered or is to enter the smart gate arrangement 61, and at least two separate exits, through which each animal, which has entered the smart gate arrangement 61, can be selectively guided to exit the smart gate arrangement 61 after having been identified, to thereby be guided to a respective one of a first 62a and a second 62b buffer pen. The first buffer pen 62a leads to the first milking system 12 via lanes 15a and the second buffer pen 62 leads to the second milking system 13 via lanes 15b. The first and second buffer pens 62a, 62b constitute a buffer area 62.

The first milking system 12 is a robot based automatic milking system comprising three stationary milking boxes 12a, 12b, 12c, in each of which one animal is milked at a time in an entirely automatic manner, and the second milking system 13 comprises a rotary based milking implement 13a and one stationary milking box 12d, in which one animal is milked at a time in an entirely automatic manner.

The first milking system 12 comprises an exit lane 16a, which ends into the nearby located common exit lane 16. The second milking system 13 comprises an exit lane 16b, which also ends into the common exit lane 16. To achieve this, the exit lane 16b of the second milking system 13 surrounds, or at least partly surrounds, the first milking system 12, that is, animals leaving the second milking system 13 are guided around the first milking system 12, in the exit lane 16b, before they can enter the common exit lane 16.

Each of the lanes 14, 16, 15a-b, and 16a-b as well as the buffer pens 62a, 62b may be delimited by sidewalls or fences.

The common exit lane 16 may comprise a smart gate arrangement 16-1 including an entrance through which animals can enter the smart gate arrangement 16-1, an animal identifier for identifying each animal having entered or is to enter the smart gate arrangement 16-1, and at least two separate exits, through which each animal, which has entered the smart gate arrangement 164, can be selectively guided to exit the smart gate arrangement 16-1 after having been identified, to thereby be guided (i) to exit the milking arrangement 11 through the common exit lane 16 or (ii) to the first milking system 12 to be milked therein.

The latter possibility may be used if an animal is not appropriately milked in either of the milking systems 12, 13. In such instance, the animal can be led to the first milking system 12 for another milking attempt instead of leading it to exit the milking arrangement 11.

The smart gate arrangement 61 is configured, during selected periods of time, to guide each animal, which has entered the smart gate arrangement 61, to exit the smart gate arrangement 61 through a single exit, to thereby be guided to a single one of the first and second milking systems, irrespective of the identity of the animal.

This is an advantageous approach to avoid too low utilization of the milking arrangement, e.g. during night time, since one of the milking systems 12; 13 may be shut down for a period of time while all animals entering the smart gate arrangement 61 are guided to the other milking system 13; 12.

Especially if one milking system 13 comprises a rotary based milking implement 13a with a rotating platform, on which the animals stand while being milked, this milking system 13 may be shut down during periods of low utilization, such as during night time, while all animals entering the smart gate arrangement 61 are guided to the other milking system 12, which preferably may be a robot based automatic milking system comprising one or more stationary milking boxes, in each of which one animal is milked at a time in an entirely automated manner.

Hereby the milk production efficiency can be increased since the rotary based milking implement 13a is not used when it can be expected to be less occupied due to the lower amounts of animals visiting the milking arrangement 11. Further, most rotary based milking implements 13a require the presence of staff. By only using the robot based automatic milking system 12 during night time, the night time staff can be strongly reduced, which in turn reduces the costs of running the dairy farm.

Figure 2:
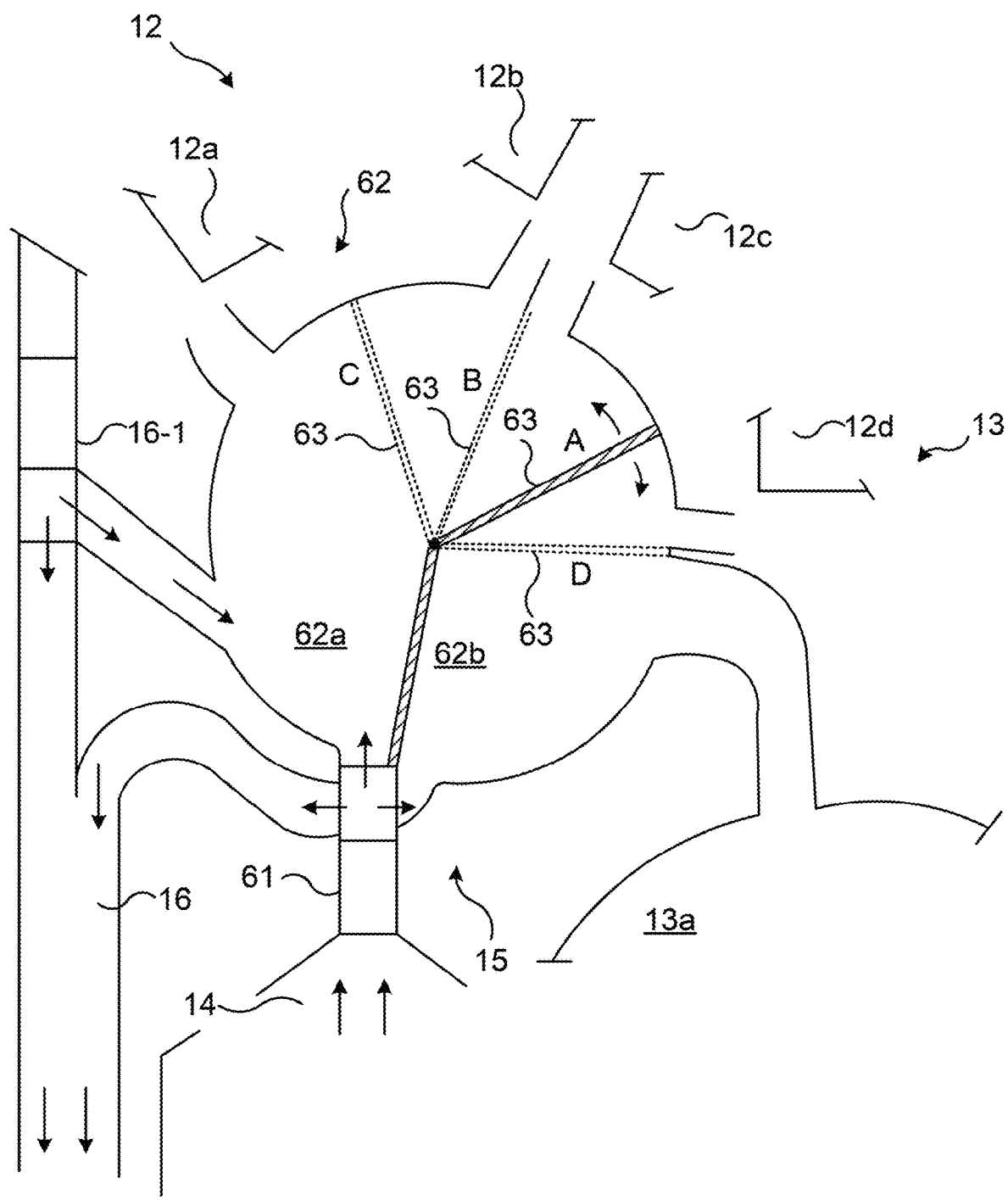
FIG. 2 illustrates, schematically, in top view, a buffer area of the milking arrangement of FIG. 1 in greater detail.

FIG. 2 illustrates, schematically, in top view, the buffer area 62 of the milking arrangement 11 of FIG. 1 in greater detail.

In one embodiment, the respective buffer pens 62a, 62b are separated by a partition wall 63, which is movable between the position A and the positions B, C, and D as shown by the partition wall 63 in dashed lines.

Moving the partition wall 63 into position A, the first milking system 12 will comprise the three stationary milking boxes 12a, 12b, and 12C and the second milking system 13 will comprise the rotary based milking implement 13a and the stationary milking box 12d, moving the partition wall 63 counterclockwise into position B, the first milking system 12 will comprise the two stationary milking boxes 12a and 12b and the second milking system 13 will comprise the rotary based milking implement 13a and the two stationary milking boxes 12c and 12d, moving the partition wall 63 counterclockwise into position C, the first milking system 12 will only comprise the stationary milking box 12a and the second milking system 13 will comprise the rotary based milking implement 13a and the three stationary milking boxes 12b, 12c, and 12d, and moving the partition wall 63 clockwise into position D, the first milking system 12 will comprise all four stationary milking boxes 12a, 12b, 12C, and 12d and the second milking system 13 will only comprise the rotary based milking implement 13a. In other words, the first milking system 12 is defined as the milking equipment which is reached from the first buffer pen 62a and the second milking system 13 is defined as the milking equipment which is reached from the second buffer pen 62b.

By moving the partition wall 63 into different positions A, B, C, D one or more milking system entries is/are relocated from one 62a; 62b of the buffer pens to the other one 62b; 62a of the buffer pens, to thereby alter the sizes, and thus capacities, of the first and second milking systems 12, 13.

By means of the capabilities to alter the sizes, and thus capacities, of the first and second milking systems 12, 13 bottle necks (i.e. very high utilization of one of the milking systems 12, 13) may be avoided. The sizes, and thus capacities, of the first and second milking systems 12, 13 can be adapted to the milking demands of the first and second milking systems 12, 13, which in turn depend on the number or shares of animals to be milked in the first and second milking systems 12, 13, respectively.

Figure 3:
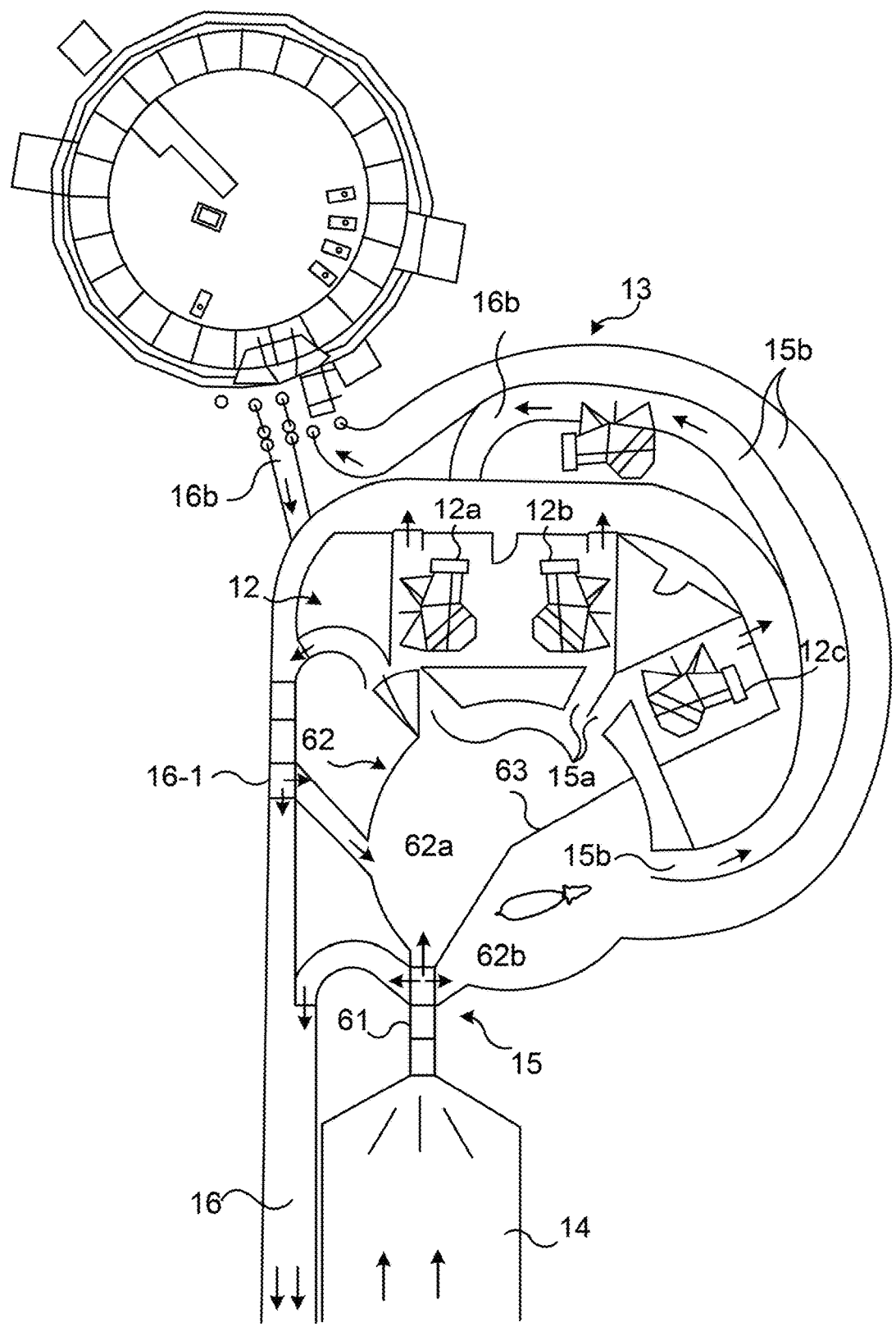
FIG. 3 illustrates, schematically, in top view, a milking arrangement according to an alternative embodiment.

FIG. 3 illustrates, schematically, in top view, a milking arrangement 11 according to an alternative embodiment, which differs from the embodiment of FIG. 1 only with respect to the following.

The exit lanes 16a, 16b of the milking systems 12, 13 are here arranged adjacent one another and can be arranged to end into the common exit lane 16 without any detours. However, in the embodiment of FIG. 3, the guiding structure 15 comprises lanes 15b leading to the entry of the second milking system 13 (i.e. to the rotary based milking implement 13a and to the stationary milking box 12d), which lanes 15b surround the first milking system 12. That is, animals guided to the the second milking system 13 are led around the first milking system 12, in the lanes 15b, before they can enter the second milking system 13 (i.e. the rotary based milking implement 13a or the stationary milking box 12d).

It shall be appreciated that while FIGS. 1 and 3 illustrate two extremes (with a long surrounding exit lane 16b and long surrounding lanes 15b, respectively), there exist intermediate solutions wherein the exit lane(s) 16b of the second milking system 13 and the lane(s) 15b of the guiding structure 15 leading to the entry of the second milking system 13 together surround, or at least partly surround, the first milking system 12.

While embodiments have been disclosed in detail above, the scope of protection is given by the appended claims.

The invention claimed is:

1. A milking arrangement (11), comprising:
   at least a first (12) and a second (13) milking system for milking animals;
   a common entrance lane (14) configured to allow a plurality of animals to enter the milking arrangement; and
   a guiding structure (15) configured to guide each of the plurality of animals to either one of the first and second milking systems to be milked therein, the guiding structure comprised of a smart gate arrangement (61) that includes
      an entrance configured to permit animals to enter the smart gate arrangement,
      an animal identifier that identifies each animal having entered or is to enter the smart gate arrangement, and
      at least two separate exits, through which, in a first operating mode of the smart gate arrangement, each animal which has entered the smart gate arrangement is selectively guided to exit the smart gate arrangement after having been identified, thereby to be guided to a respective one of the first and second milking systems depending on the identity of the animal,
   wherein the smart gate arrangement is further configured to operate, in accordance with one or more selected periods of time, in a second operating mode where, in the event that an animal has entered the smart gate arrangement during one of said selected periods of time, the smart gate arrangement operates in such a manner as to guide the animal out from the smart gate arrangement and into a single one of the first and second milking systems irrespective of the identity of the animal,
   wherein the one or more selected periods of time are determined as periods of time during which utilization of the milking arrangement meets a selected criterion.

2. The milking arrangement of claim 1, wherein the selected periods of time are periods of time during which the utilization of the milking arrangement meets the selected criterion based on historical data of the utilization of the milking arrangement.

3. The milking arrangement of claim 1, wherein the selected periods of time are periods of time during which the utilization of the milking arrangement meets the selected criterion based on continuous measurements of the utilization of the milking arrangement.

4. The milking arrangement of claim 1, wherein the selected criterion operates in accordance with a determination that the utilization of the milking arrangement is lower than a selected threshold.

5. The milking arrangement of claim 1, wherein the smart gate arrangement is configured, during the selected periods of time, which are during night time, to guide each animal, which has entered the smart gate arrangement, to exit the smart gate arrangement to thereby be guided to the single one of the first and second milking systems irrespective of the identity of the animal.

6. The milking arrangement of claim 1, wherein the first milking system is an automatic milking system comprising one or more stationary milking boxes, in each of which one animal is automatically milked at a time, and the second milking system comprises a rotary milking system.

7. The milking arrangement of claim 1, wherein the single one of the first and second milking systems is the first milking system.

8. The milking arrangement of claim 1,
   wherein the first milking system comprises a first exit lane (16a), and the second milking system comprises a second exit lane (16b), and
   wherein at least one of the second exit lane (16b) and an entrance lane (15b) leading to the entry of the second milking system at least partly surrounds the first milking system.

9. The milking arrangement of claim 1,
   wherein the first milking system comprises a first exit lane (16a), and the second milking system comprises a second exit lane (16b), and
   wherein the first and second exit lanes comprise another smart gate arrangement (16-1) configured to guide all incompletely milked animals exiting from the first and second milking systems to a single one of the first and second milking systems to be milked again therein.

10. The milking arrangement of claim 9, wherein said incompletely milked animals are animals that have not been milked sufficiently due to any of a failure of attaching teat cups to the teats of the animals and due to teat cups being unintentionally removed from the teats of the milking animals during milking.

11. A method for guiding animals through a milking arrangement (11) that includes at least a first (12) and a second (13) milking system for milking animals, a common entrance lane (14) configured to allow a plurality of animals to enter the milking arrangement, and a guiding structure (15) configured to guide each of the plurality of animals to either one of the first and second milking systems to be milked therein, where the guiding structure is comprised of a smart gate arrangement (61) that includes an entrance configured, in a first operating mode, to permit animals to enter the smart gate arrangement, an animal identifier that identifies each animal having entered or is to enter the smart gate arrangement, and at least two separate exits, through which each animal, which has entered the smart gate arrangement, is selectively guided to exit the smart gate arrangement after having been identified, thereby to be guided to a respective one of the first and second milking systems depending on the identity of the animal, said method comprising the steps of:
- configuring the smart gate arrangement with one or more selected periods of time; and
- in the event that an animal enters the smart gate arrangement during one of said selected periods of time, the smart gate arrangement operates in a second operating mode to guide the animal to only a single one of the first and second milking systems, irrespective of the identity of the animal,
- wherein the selected periods of time are determined as periods of time during which utilization of the milking arrangement meets a selected criterion.

12. The method of claim 11, wherein the selected criterion is based on historical data of the utilization of the milking arrangement.

13. The method of claim 11, wherein the selected criterion is based on continuous measurements of the utilization of the milking arrangement.

14. The method of claim 11, wherein the selected criterion is such that the animals are guided based on a determination whether the utilization of the milking arrangement is lower than a selected threshold.

15. The method of claim 11, wherein each animal, which has entered the smart gate arrangement, is guided during the selected periods of time, which occur during night time, to exit the smart gate arrangement to thereby be guided to the single one of the first and second milking systems irrespective of the identity of the animal.

16. The method of claim 11, wherein the first milking system is an automatic milking system comprising one or more stationary milking boxes, in each of which one animal is automatically milked at a time, and the second milking system comprises a rotary milking system.

17. The method of claim 11, wherein the single one of the first and second milking systems is the first milking system.

18. The method of claim 11,
- wherein the first milking system comprises a first exit lane (16a), and the second milking system comprises a second exit lane (16b), and
- wherein at least one of the exit lane (16b) of the second milking system and an entrance lane (15b) leading to the entry of the second milking system at least partly surrounds the first milking system.

19. The method of a claim 11, wherein the first milking system comprises a first exit lane (16a), and the second milking system comprises a second exit lane (16b), and
- wherein all incompletely milked animals exiting from the first and second milking systems are guided to a single one of the first and second milking systems to be milked again therein, by means of another smart gate arrangement (16-1) arranged in the exit lanes.

20. The method of claim 19, wherein said incompletely milked animals are animals that have not been milked sufficiently due to a failure of attaching teat cups to the teats of the animals or due to teat cups being unintentionally removed from the teats of the milking animals during milking.

* * * * *